June 24, 1930.  C. M. McCORD  1,767,151
HAND LATHE
Filed Nov. 4, 1925
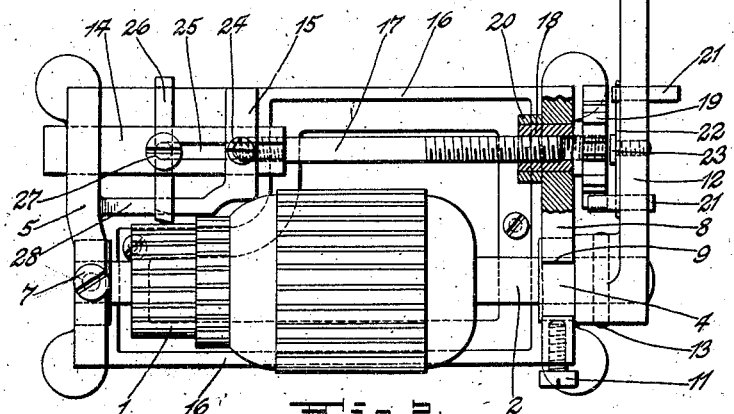
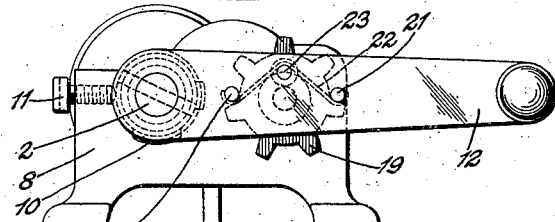
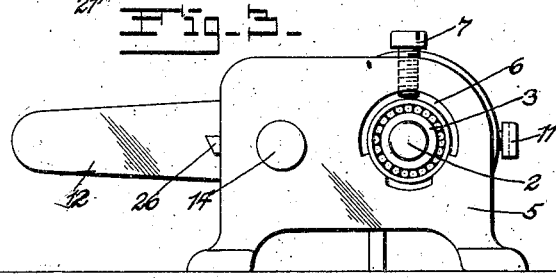
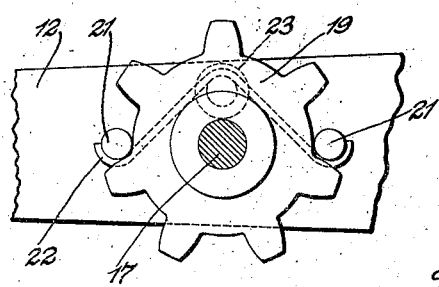
Inventor:
Claude M. McCord,
His Attorneys.

Patented June 24, 1930

1,767,151

UNITED STATES PATENT OFFICE

CLAUDE M. McCORD, OF RICHMOND HEIGHTS, MISSOURI

HAND LATHE

Application filed November 4, 1925. Serial No. 66,694.

This invention relates to hand lathes, and is specially designed and adapted for use in dressing small objects such as worn commutators of Ford automobiles, although its usefulness is not restricted to that purpose.

An object of the invention is to provide a lathe equipped with means for supporting the armature shaft to which the commutator is attached, and mechanism for rotating the shaft and the commutator and dressing the commutator as an incident to such rotation.

Another object of the invention is to provide a lathe of the character mentioned having means operated by the devices that rotate the armature shaft to operate the cutting tool so that it cuts spirally around the commutator to dress the same and remove undesirable irregularities from the surface thereof. The mechanism for obtaining this operation is also operative to reverse the direction of movement of the cutting tool so that it will travel in opposite directions between the ends of the commutator.

Other objects will appear from the following description, reference being made to the accompanying drawings in which Fig. 1 is a plan view of my improved machine, parts being in section.

Fig. 2 is an elevation of one end of the machine.

Fig. 3 is an elevation of the opposite end.

Fig. 4 is an enlarged detail showing parts utilized in imparting reverse direction movements to the cutting tool.

It is a familiar fact that the commutator 1 is rigid upon a shaft 2 having an antifriction bearing 3 mounted thereon near the end of the commutator, and an antifriction bearing 4 near the opposite end of said shaft. These bearings constitute the supporting bearings for the armature shaft when in use.

The present invention comprises a frame for supporting the bearings of the armature shaft to permit rotation of the shaft in the frame. As shown, the end 5 of the frame has an opening 6 somewhat larger than the bearing 3, permitting easy insertion of the bearing 3 therein. The end 5 of the frame also supports a set screw 7 which is settable to clamp upon the outer ring of the bearing 3 to hold the same therein when the shaft 2 is operated. The opposite end 8 of the frame has a slot 9 of sufficient width to permit passage of the shaft 2 therethrough to get the bearings 3 and 4 in position to permit endwise movement of the shaft 2 to place the bearing 3 in the opening 6 and the bearing 4 in the opening 10. A set screw 11 is settable to clamp the bearing 4 in the opening 10, so that the two set screws 7 and 11 cooperate to hold the armature shaft from endwise movement and from lateral oscillation when the machine is operated.

The shaft 2 and the commutator 1 are rotated by a crank 12 attached to the end of the shaft 2 beyond the end 8 of the supporting frame by a pin 13. A bar 14 is supported for sliding movements by the frame end 5 and by a frame part 15 supported by one of the side connections 16 of the frame. The bar 14 is attached to the inner end of a rod 17, the outer end of which screws into the internally threaded trunnion 18 extending laterally from a gear wheel 19 with which it is rigidly united. The trunnion 18 is journaled in the frame end 8 and is held from outward movement by a collar 20 rigid on the inner end thereof. When the gear 19 is rotated alternately in opposite directions the rod 17 will be moved longitudinally alternately in opposite directions, as is obvious.

The crank 12 supports a pair of pins 21 selectively settable in positions to engage the gear 19 once during each revolution of the crank 12. When one pin 21 is in position to engage the gear the other pin must be out of such position, and vice versa. The pins are held in their endwise adjusted positions by a spring 22 held on a support 23 and engaging the pins 21 with sufficient force to prevent accidental endwise movement of said pins. The pins are arranged so that one of them will engage the inner periphery of the gear 19 and the other will engage the outer periphery of said gear, thus providing means for rotating the gear in opposite directions when the crank 12 is rotated in one direction.

The bar 14 is held from turning by a screw 24 passing through the frame part 15 into a slot 25 in said bar 14.

The cutting tool 26 extends through and is clamped in the bar 14 by a set screw 27 and has its inner end resting upon a frame part 28 connecting the frame parts 5 and 15 so as to obtain desired rigidity of the cutting tool during operation of the machine.

To prepare the machine for operation the commutator and its shaft are assembled therein with the crank 12 attached to the shaft as described, and the cutting tool 26 in position to begin cutting upon the surface of the commutator from the outer end to the inner end of the commutator as the shaft 2 is turned by the crank. When the cutting tool reaches the inner end of the commutator the positions of the pins 21 are reversed so that during continued rotation of the crank 12 the rod 17 will be moved in the opposite direction from which it was first moved, and the cutting tool 26 is moved outwardly from the inner end to the outer end of the commutator. The cutting operation is continued in this way until desired results are obtained, after which the commutator and its connected parts are removed from the machine for further use.

The machine is capable of variation within equivalent limits, without departure from the nature and principle of the invention, and I do not restrict myself to the specific form and arrangement shown and described.

What I claim and desire to secure by Letters Patent is:—

1. A machine of the character described, comprising a frame having parts designed and operative to support the bearings of an armature shaft, a crank arm, means for attaching the crank arm to the armature shaft, a cutting tool, and means operated by the crank arm for operating the cutting tool.

2. A machine of the character described, comprising a frame having parts designed and operative to support the bearings of an armature shaft, a crank arm, means for attaching the crank arm to the armature shaft, a cutting tool, and means operated by the crank arm for operating the cutting tool alternately in opposite directions.

3. A machine of the character described, comprising a frame, means for engaging and supporting the bearings of an armature shaft in said frame leaving the shaft free to rotate, means for rotating said shaft, a cutting tool, and mechanism operated by said rotating means to operate said cutting tool.

4. A machine of the character described, comprising a frame, means for engaging and supporting the bearings of an armature shaft in said frame leaving the shaft free to rotate, means for rotating said shaft, a cutting tool, and mechanism operated by said rotating means to operate said cutting tool alternately in opposite directions.

5. A machine of the character described, comprising a frame, means in said frame for engaging and holding the bearings of an armature shaft, a device for rotating the armature shaft, a support in said frame, means for mounting and holding a cutting tool in said support, and mechanism operated by said device for moving said cutting tool support longitudinally.

6. A machine of the character described, comprising a frame, means in said frame for engaging and holding the bearings of an armature shaft, a device for rotating the armature shaft, a support in said frame, means for mounting and holding a cutting tool in said support, and mechanism operated by said device for moving said cutting tool support longitudinally in opposite directions parallel with said shaft.

7. A machine of the character described, comprising a frame, means in said frame for engaging and holding the bearings of an armature shaft, a device for rotating the armature shaft, a support in said frame, means for mounting and holding a cutting tool in said support, and mechanism operated by said device for moving said cutting tool support longitudinally parallel with said shaft.

8. A machine of the character described, comprising a frame, means for supporting in said frame the bearings of an armature shaft, a device for rotating said shaft, a rotative element supported by said frame, a cutting tool mounted in said frame, connections from said rotative element for moving said cutting tool parallel with said shaft when said rotative element is rotated, and means for rotating said element by said device.

9. A machine of the character described, comprising a frame, means for supporting in said frame the bearings of an armature shaft, a device for rotating said shaft, a rotative element supported by said frame, a cutting tool mounted in said frame, connections from said rotative element for moving said cutting tool alternately in opposite directions parallel with said shaft when said rotative element is rotated, and means for rotating said element alternately in opposite directions by said device.

10. A machine of the character described comprising a frame having openings designed to receive the bearings of an armature shaft, a crank arm, means for attaching the crank arm to the armature shaft outside of said frame, a cutting tool, a gear wheel rotatively supported by the frame and held from axial movements thereby, a rod in connection with said cutting tool having threaded connection with said gear wheel for longitudinal movements by said gear wheel, and means operated by said crank for rotating said gear wheel.

11. A machine of the character described comprising a frame having openings designed to receive the bearings of an armature shaft, a crank arm, means for attaching the crank arm to the armature shaft outside of said frame, a cutting tool, a gear wheel rotatively supported by the frame and held from axial movements thereby, a rod in connection with said cutting tool having threaded connection with said gear wheel for longitudinal movements by said gear wheel, and means operated by said crank for rotating said gear wheel alternately in opposite directions to move said rod and thereby said cutting tool alternately in opposite directions.

12. The method of machining armature commutators consisting in centering the armature bearings in a lathe and supporting the armature for normal rotation in said bearings, mechanically rotating the armature in said bearings, and simultaneously feeding a tool along a line parallel to the armature axis in cutting relation to the peripheral surface of its commutator.

13. A machine of the character described comprising a frame, means in said frame for receiving and engaging and holding the bearings of an armature shaft while the bearings remain attached to said shaft, a device for rotating the armature shaft, a support in said frame, a cutting tool carried by said support, and mechanism operated by said device for moving said cutting tool support longitudinally parallel with the axis of the armature shaft.

14. A machine of the character described comprising a frame, means in said frame for receiving and engaging and holding the bearings of an armature shaft while the bearings remain attached to said shaft, a device for rotating the armature shaft, a support in said frame, a cutting tool carried by said support, and mechanism operative by said device for moving said cutting tool support longitudinally in opposite directions parallel with the axis of the armature shaft.

CLAUDE M. McCORD.